April 1, 1924.
R. W. CASTOR
POURING DEVICE FOR SEPARATING MILK AND CREAM
Filed Feb. 7, 1923
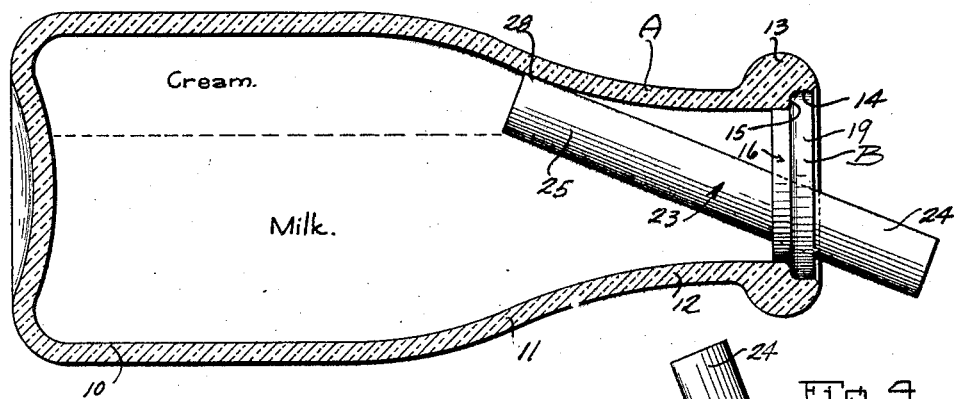
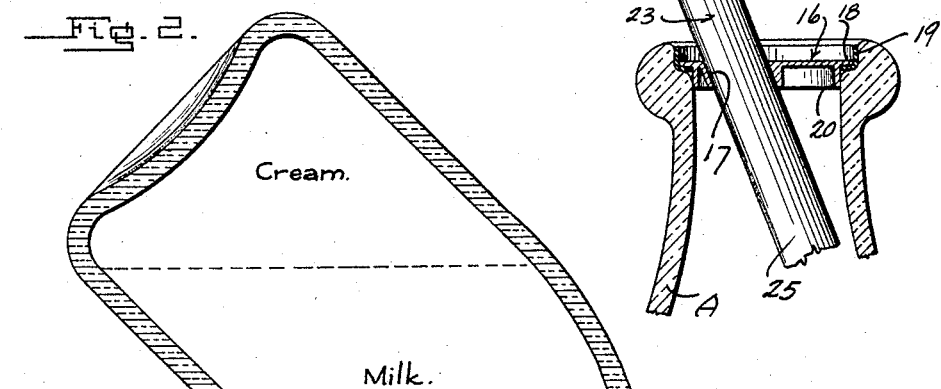
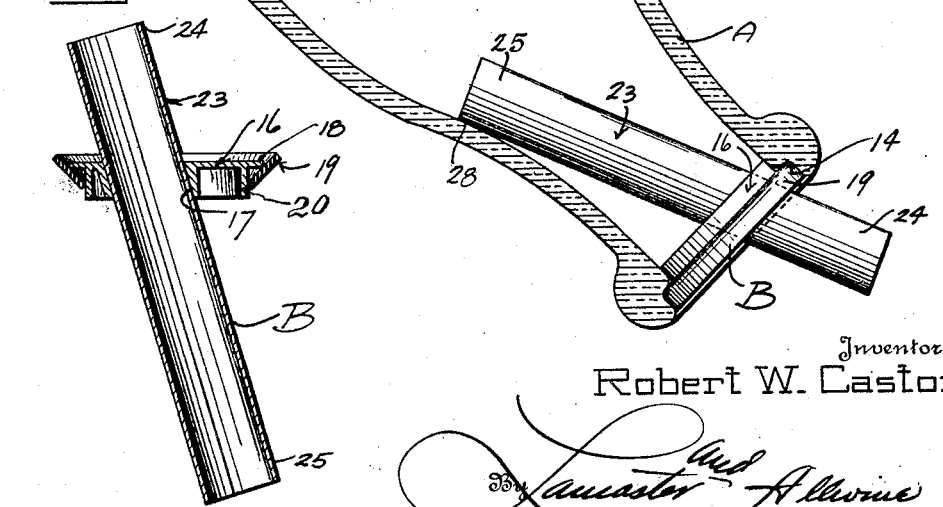
Inventor
Robert W. Castor Patented Apr. 1, 1924.

1,488,865

UNITED STATES PATENT OFFICE.

ROBERT W. CASTOR, OF BEAUMONT, TEXAS.

POURING DEVICE FOR SEPARATING MILK AND CREAM.

Application filed February 7, 1923. Serial No. 617,577.

*To all whom it may concern:*

Be it known that I, ROBERT W. CASTOR, a citizen of the United States, residing at Beaumont, in the county of Jefferson and State of Texas, have invented certain new and useful Improvements in Pouring Devices for Separating Milk and Cream, of which the following is a specification.

This invention relates to an improved device to facilitate the separation and pouring of cream and milk from receptacles, such as the ordinary milk bottle.

The primary object of this invention is the provision of an inexpensive cap for milk bottles including a tube for selectively conveying cream or milk from the bottle in a facile manner, without disturbing the separated cream and milk so that the same will combine.

Other objects and advantages of this device will be apparent during the course of the following detailed description.

In the accompanying drawing, forming a part of this specification, and wherein similar reference characters designate corresponding parts throughout the several views, Figure 1 is a longitudinal cross sectional view taken through a milk bottle, showing the same in a horizontal position and having the improved pouring device associated therewith for the drawing of cream.

Figure 2 is a longitudinal cross sectional view through a milk bottle, showing the same in an inclined position, whereby the improved pouring device may be utilized for extraction of milk.

Figure 3 is a longitudinal cross sectional view taken through the improved liquid pouring device.

Figure 4 is a fragmentary view, partly in section, showing the manner in which the improved pouring device is mounted in the neck of the ordinary milk bottle.

In the drawing, wherein for the purpose of illustration is shown the preferred embodiment of this invention, the letter A designates a container, such as the ordinary milk bottle, having the improved pouring device B detachably associated therewith.

The milk bottle A preferably includes the body portion 10, gradually converging as at 11 to a neck portion 12. The mouth portion 13 thereof is provided with the circumferential groove 14 inwardly from the end thereof to provide the cap supporting shelf 15 about the opening of the bottle A.

The pouring device B is of relatively simple construction and includes the sealing cap 16, preferably of cast material, having the opening 17 cast therethrough at an acute angle to the plane of said cap 16. An outwardly extending annular flange 18 is likewise cast upon this cap 16 adapted for cooperation with a washer ring 19 of rubber or analogous material, for support upon the bottle shelf 15. An annular portion 20 is adapted for insertion into the neck of the bottle to engage the same below the annular shelf 15, as clearly illustrated in Figure 4 of the drawing. It is to be noted that the aperture or opening 17 is disposed eccentrically in the cap 16 adjacent one side thereof.

A tube 23, preferably of sheet material and of uniform diameter throughout the length thereof, is provided, of straight line formation, adapted for secure mounting within the cap opening 17, as by soldering, brazing or the like, so that one relatively short end 24 extends from the outside of the cap 16, and a relatively longer end 25 extends from the inside of said cap 16.

In the placement of the pouring device B in the bottle A, the gasket or washer 19 is disposed beneath the flange 18, and when the cap 16 is forced into the bottle A, the gasket 19 is disposed below the flange 18 resting directly upon the annular shoulder 15, while a portion is also disposed in engagement with the side of the bottle groove 14, extending upwardly from the cap 16, as is clearly illustrated in the drawing. In this relation of the device B to the bottle A, the relatively longer portion 25 of the tube 23 extends into the chamber of the bottle 10, so that the free end of the tube portion 25 contacts the converging bottle portion 11 at the point 28, as can readily be seen in Figures 1 and 2 of the drawings. In this position, the free end of the exterior portion 25 is disposed toward the opposite side of the bottle A from that which the free end of the inner portion 25 contacts.

In order to pour cream, it is necessary for a person to position the bottle in horizontal manner, as illustrated in Figure 1, whereby the free end of the inner tube portion 25, is uppermost, so that the cream which is of less specific gravity than the milk, will flow through the tube 23 and exit from the bottle A, as can readily be understood from Figure 1 of the drawing. On the other hand, if it is desired merely to extract milk from the bottle, the bottle is so positioned that the point of contact between the inner tube portion 25 and the bottle is lowermost, and upon inverting the bottle, as is illustrated in Figure 2, the cream will rise to the position above the inside end of the tube 23, so that the milk in the bottle may readily flow from the tube 23, as can readily be understood from Figure 2 of the drawing.

In view of the foregoing, it can be seen that a pouring device has been provided, which is susceptible of universal use upon milk bottles and like containers for the separation of the different ingredients of a liquid having different specific gravities.

Various changes in the shape, size, arrangement of parts and substitution of materials may be made to the form of invention herein shown and described, without departing from the spirit of this invention or the scope of the claims.

I claim:

1. In a device for the selective extraction of liquids of different specific gravities, the combination with a receptacle, of a liquid pouring device therefor including a cap for connection to the receptacle, and a tubular member connected intermediate its ends to said cap in acute angular relation therewith, said pouring device when applied on the receptacle having the inner end of said tube disposed within the receptacle in engagement at one side of said receptacle, whereby when the bottle is horizontally disposed with the inner end of the tube uppermost the liquid of lightest specific gravity may flow into said inner end of the tube to be dispensed from the receptacle, and when the receptacle is inverted with the inner end of the tube at the lowermost side of the receptacle the liquid of heaviest specific gravity may flow into the tube to be dispensed from the receptacle.

2. In a device for the selective extraction of liquids of different specific gravities the combination with a receptacle, of a liquid pouring device therefor including a cap for connection to the receptacle, and a tubular member connected intermediate its ends to the cap in such an angular relation that when the pouring device is applied on the receptacle the inner end of said tube will lie adjacent a side of the receptacle, whereby when the bottle is substantially horizontally positioned and the inner end of the tube uppermost the liquid of lightest specific gravity will flow into the tube to be dispensed from the receptacle, and when the receptacle is inverted with the inner end of the tube adjacent the lowermost side of the receptacle the liquid of highest specific gravity will flow into the tube to be dispensed from the receptacle.

ROBERT W. CASTOR.